Patented Dec. 25, 1928.

1,696,614

UNITED STATES PATENT OFFICE.

WILLARD R. STEELE, OF SCOTIA, NEW YORK, ASSIGNOR TO GENERAL ELECTRIC COMPANY, A CORPORATION OF NEW YORK.

HEAT-RESISTANT COMPOSITION SUITABLE FOR ARC DEFLECTORS.

No Drawing.    Application filed May 20, 1926. Serial No. 110,465.

My present invention relates to heat resistant compositions and more particularly to such compositions which are adapted to be employed as arc deflectors in controllers, arc chute linings, dead segments and the like, where resistance to intermittent arcing is desired. Hitherto, in the manufacture of arc resistant compositions, it has been usual to employ a large amount of silica, the silica being introduced either as free silica in the form of flint, or in the form of a silicate such as asbestos, a large amount of silica being desirable in order to obtain a product having strength, density and other desirable properties. Silica in relatively large amounts and especially in arc deflectors is, however, to a certain extent undesirable, since in the presence of arcing between pure copper or copper alloy contacts, the surface of the deflector becomes covered with a fused copper silicate which generally greatly impairs and very soon completely destroys the deflector.

It is one of the objects of my invention to provide an improved heat resistant article having a low silica content, a high resistance to arcing and a high degree of mechanical strength.

In carrying out my invention, I mix varying proportions of a refractory metallic oxide, such as zirconia, and lime, with short white asbestos fibres, the lime and oxide being in a finely divided condition. I have found that a composition consisting of approximately 65% zirconia, 5% slaked lime and 30% asbestos gives very satisfactory results. The proportions of materials employed, however, may vary considerably, for example, the zirconia content may vary from 10 to 75%, the lime from 5-60%, and the asbestos from 20 to 40%. In general the lower lime content will be associated with the higher zirconia content and vice versa.

The materials employed are thoroughly mixed, moistened with water, and pressed into the desired form. The molded product is dried in any suitable manner, as in an oven, and then subjected to a steam pressure of 120 to 150 pounds per square inch for a period of time which may vary from 6 to 12 hours. The steam pressure converts the mass to a hard, stone-like product which is then given a final drying to remove residual moisture after which the material is ready for use.

The nature of the reaction which takes place during the steam treatment is at present unknown to me. The resultant product, however, is highly basic in character and stone-like in appearance. It is stronger, tougher, and more highly resistant to heat and arcing than silicious compositions and is not susceptible to attack from copper or copper oxide deposited on its surface as a result of arcing. Furthermore, it may be readily pressed to any form desired and drilled or machined.

What I claim as new and desire to secure by Letters Patent of the United States is:

1. A steam hardened heat resistant material having basic characteristics and containing a zirconium compound.

2. A steam hardened heat resistant composition consisting principally of lime and a zirconium compound.

3. A steam hardened heat resistant composition consisting largely of zirconium oxide and a basic material.

4. A heat resistant material containing zirconia, lime and asbestos.

5. A compostion of matter containing approximately 30% of asbestos, the remainder of the composition comprising a basic material and zirconia.

6. A composition of matter comprising 10-75% of zirconia, 5-60% of lime and a substantial proportion of an inorganic fibrous material.

7. A composition of matter containing 10-75% zirconia, 5-60% of lime, the lower zirconia content being associated with the higher lime content and vice versa.

8. A steam hardened, heat resistant material comprising zirconia and lime, and a substantial proportion of asbestos.

9. A steam hardened, heat resistant composition consisting largely of zirconium oxide and lime.

10. An arc deflector containing approximately 30% of asbestos, 10-75% of zirconia and 5-60% of lime.

11. A composition of matter containing about 65% zirconia, about 5% slaked lime, and about 30% asbestos.

In witness whereof, I have hereunto set my hand this 18th day of May, 1926.

WILLARD R. STEELE.